April 20, 1948.  A. B. SVENSSON  2,439,993
MACHINE FOR MAKING CRISP BREAD
Filed Jan. 30, 1945  3 Sheets-Sheet 2

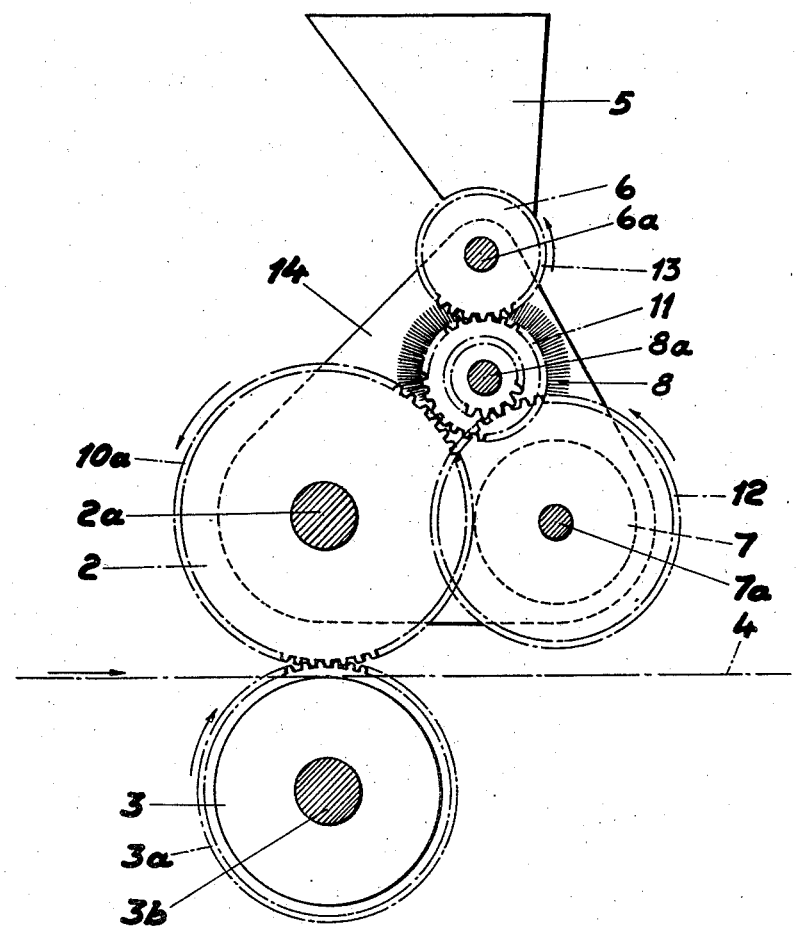

Patented Apr. 20, 1948

2,439,993

UNITED STATES PATENT OFFICE 2,439,993

MACHINE FOR MAKING CRISP BREAD

Aron Birger Svensson, Filipstad, Sweden

Application January 30, 1945, Serial No. 575,304
In Sweden January 15, 1943

Section 1, Public Law 690, August 8, 1946
Patent expires January 15, 1963

5 Claims. (Cl. 107—8)

The present invention relates to a device in those machines for making crisp bread in which the dough string moves under a rotating pricking roll, the axis of which is at right angles to the longitudinal axis of the dough string. Machines for making crisp bread generally possess the drawback that the dough sticks to the pins of the pricking roll, and as more and more dough sticks to the pins, the dough piled on the pins will cause sticking in the dough string. Consequently, the dough string will be raised from its support and accompany the pricking roll in its rotation, the drive being thereby disturbed. Moreover, the pricking roll must always be inspected.

The said drawbacks are eliminated by the device according to the invention, which is characterized by the fact that two brushing rolls, which are parallel with the pricking roll and which rotate at different speeds, are connected to the drive device of the pricking roll and are so arranged that they at least contact each other and rotate in opposite directions, one brush is so positioned that it cleans only the outer portions of the pricking pins while the other brush is positioned in such a way that it cleans the entire surfaces of the pins as well as the outer surface of the pricking roll thus effectively cleaning the same.

Figure 1:
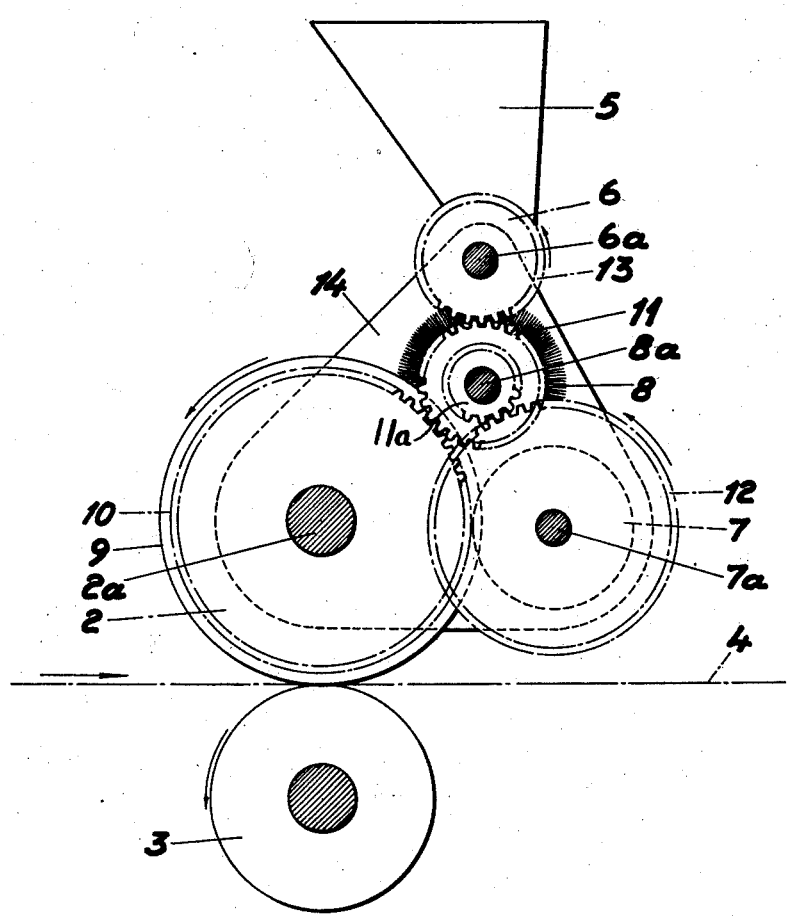
Figure 2:
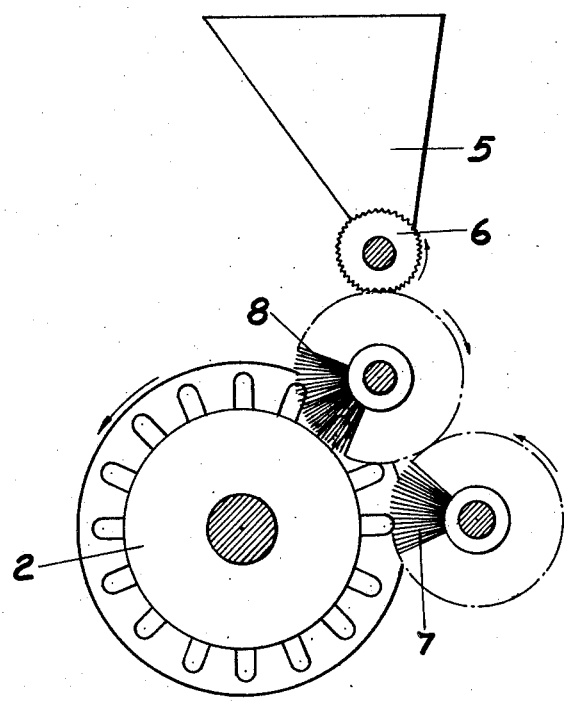

The invention is illustrated in the accompanying drawing in which:

Fig. 1 is a diagrammatical view of an embodiment of a device according to the invention for the drive of the brushes and Fig. 2 shows a suitable location of the brushes relatively to the pricking roll. Fig. 3 is a diagrammatical view of another embodiment of a device for the drive of the brushes.

Referring now, more particularly, to the drawings there is provided a pricking roll 2 positioned above a support roll 3 for the dough path 4. A hopper 5 for the flour is arranged above the pricking roll 2 while immediately below the hopper is a flour distributing roll 6.

According to the invention there are provided two brushing rolls 7 and 8 parallel with the pricking roll. The roll 7 is adapted to rotate in an opposite direction to the movement of the pricking pins, thereby sweeping their outer portions so that they are subjected to a preliminary cleaning. The other roll or brush 8, which in the embodiment shown contacts the roll or brush 7 and rotates in an opposite direction thereto, sweeps the entire surfaces of the pricking pins down to and including the surface of the pricking roll thus thoroughly cleaning each pin and the roll. The brushes not only keep the pricking roll effectively clean, they also distribute the flour coming from the hopper 5, this being the main reason for the brushes being placed in such a way that they contact each other.

According to the device as shown in Fig. 1 the pricking roll 2 is mounted on a shaft 2a which carries a friction disk 9 in frictional engagement with the support roll 3, as well as a toothed wheel 10 which is in mesh with a toothed wheel 11 located on the shaft 8a of the brush 8. On the shaft 8a is also arranged a small toothed wheel 11a. On the shaft 7a of the other brush 7 there is also located a toothed wheel 12 which is in mesh with the toothed wheel 11a. The toothed wheels 11a and 12 are preferably of such ratio that the speed of rotation of the brush 8 is four times as great as that of the brush 7. The shaft 6a of the distributing roll 6 carries a toothed wheel 13 which is in mesh with the toothed wheel 11 so that the distributing roll 6 is driven by the meshing wheels 13, 11 and 10 which latter wheel is driven by a motor, not shown. The frame 14 supports the shafts 2a, 6a, 7a and 8a. This frame is in turn carried by the base of the device.

According to the modification shown in Fig. 3 the shaft 2a of the pricking roll 2 carries a toothed wheel 10a which is in mesh with a toothed wheel 3a located on the shaft 3b of the support roll 3. The toothed wheel 10a is also in mesh with the toothed wheel 11 located on the shaft of the brush 8. The toothed wheel 12 located on the shaft 7a of the second brush 7 is in mesh with the toothed wheel 11. Also the toothed wheel 13 located on the shaft 6a of the distributing roll 6 is in mesh with the toothed wheel 11a. According to this modification either the shaft 3b or the shaft 2a may be the driving shaft depending upon which one is connected to the power source.

This invention is not to be limited to the arrangement of a drive device for the brushes since the results of this invention can be obtained if the brushes rotate in the same direction but at different speeds.

Having now described my invention, what I claim as new and desire to secure by Letters Patent is:

1. A device in machines for making crisp bread in which a dough string moves under a rotating pricking roll, the axis of which is at right angles to the longitudinal axis of the dough string, comprising two brushing rolls, which are parallel with the pricking roll and which rotate at different speeds, the said rolls being connected to the pricking roll and so arranged that they at least contact each other and rotate in opposite directions, one brush being positioned so that it cleans only the outer portions of the advancing pricking pins while the other brush is located above the first mentioned brush and in contact with the entire lengths of the pins and the outer surface of the pricking roll so as to insure effective cleaning thereof.

2. A device according to claim 1 in which a support roll is located under the string of dough in the vicinity of the pricking roll and is operatively connected with the pricking roll so as to be rotated thereby, a flour receiving hopper mounted above the last mentioned brush and a distributing roll mounted at the bottom of the hopper for passing the flour between the brushes and thence to the pricking roll, said distributing roll being in operable connection with the last mentioned brush.

3. In a machine for making crisp bread of the type in which a dough string is moved therethrough, a frame, a roll rotatably mounted in the frame above the dough string, penetrating means on the roll for contacting the dough string, brushing means rotatably mounted in the frame parallel to and adjacent the roll for cleaning the outer end portions of the penetrating means and additional brushing means rotatably mounted in the frame and positioned adjacent the pricking roll and in operative relation with the first mentioned brushing means for cleaning the remaining surfaces of the penetrating means and the outer surface of the roll.

4. A machine as claimed in claim 3 in which the respective brushing means are rotatable in opposite directions and in which means is provided for feeding flour between the brushing means onto the penetrating means of the roll.

5. A machine of the character described including a frame member, a pricking roll carried by the frame member and positioned at right angles to and above the dough path, a toothed wheel mounted on said roll, a supporting roll beneath the dough path, a toothed wheel mounted on the supporting roll and meshing with the toothed wheel on the pricking roll, two contacting brushing rolls carried by the frame member and positioned adjacent the pricking roll, a toothed wheel mounted on one brushing roll meshing with the toothed wheel on the pricking roll, a second toothed wheel mounted on this roll, a toothed wheel mounted on the second brushing roll in mesh with the second toothed wheel on the first brushing roll the arrangement being such that an alternative drive is possible either through the toothed wheel on the pricking roll or the toothed wheel on the supporting roll.

ARON BIRGER SVENSSON.